July 13, 1926.

C. HAERING 1,592,425

REVOLVING HEADLIGHT FOR AUTOMOBILES

Filed July 9, 1925    2 Sheets-Sheet 1

INVENTOR
Charles Haering
BY
ATTORNEY

July 13, 1926.  
C. HAERING  
REVOLVING HEADLIGHT FOR AUTOMOBILES  
Filed July 9, 1925
1,592,425
2 Sheets-Sheet 2
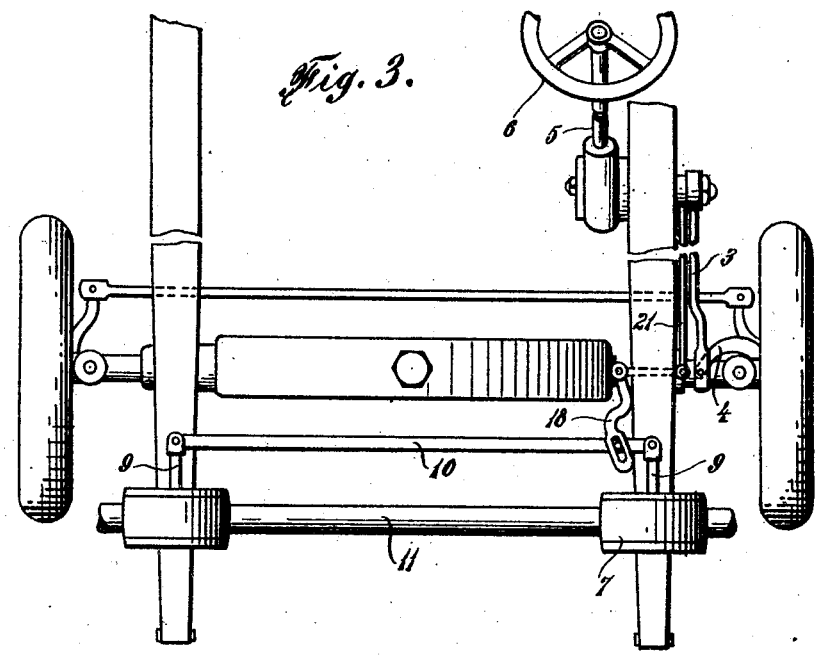
Fig. 3.
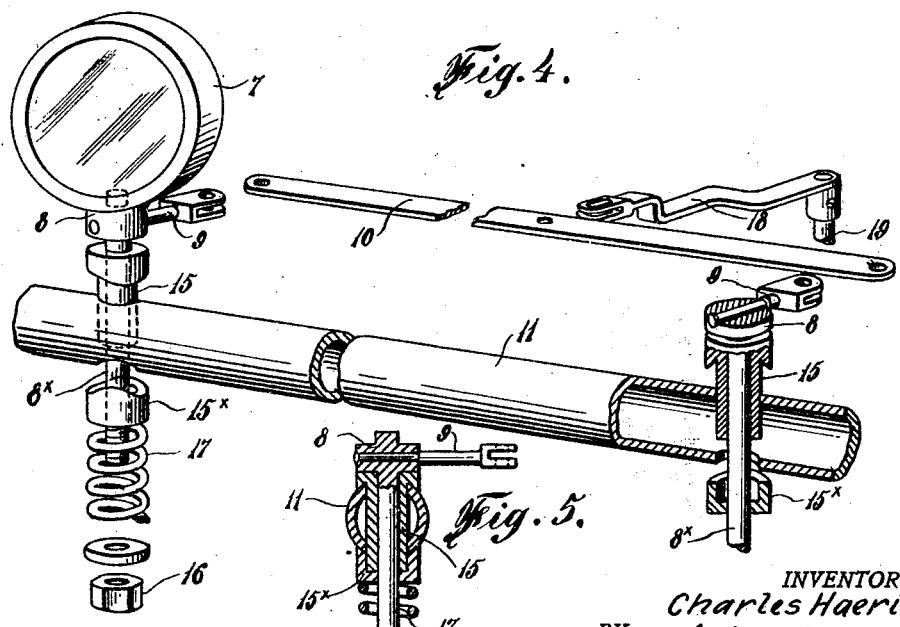
Fig. 4.
Fig. 5.
INVENTOR  
Charles Haering  
BY  
ATTORNEY Patented July 13, 1926.

BEST AVAILABLE COPY

1,592,425

UNITED STATES PATENT OFFICE.

CHARLES HAERING, OF BROOKLYN, NEW YORK.

REVOLVING HEADLIGHT FOR AUTOMOBILES.

Application filed July 9, 1925. Serial No. 42,369.

The object of the present invention is to provide automobile headlights combined with mechanism for revolving them upon a vertical axis and synchronously with the steering movements of the wheels so that the light beams at night are thrown in the same direction as the car is headed. In other words, the lamps are maintained at the same angle as the front wheels of the automobile.

The invention will be understood by reference to the accompanying drawings, in which—

Figure 3 is a plan view of the front portion of the automobile chassis equipped with an embodiment of the invention, showing in dotted lines relative positions of wheels and headlights or lamps;

Figure 4 is a detail view of the lamp connections.

Figure 1:
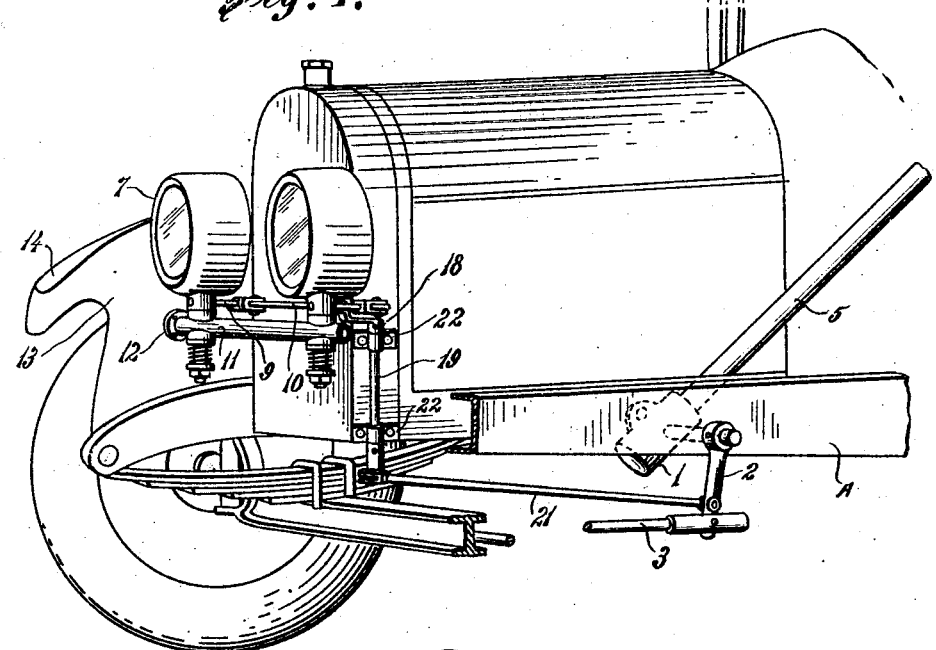
Figure 1 is a perspective view of the front portion of an automobile chassis equipped with an embodiment of the invention.
Figure 2:
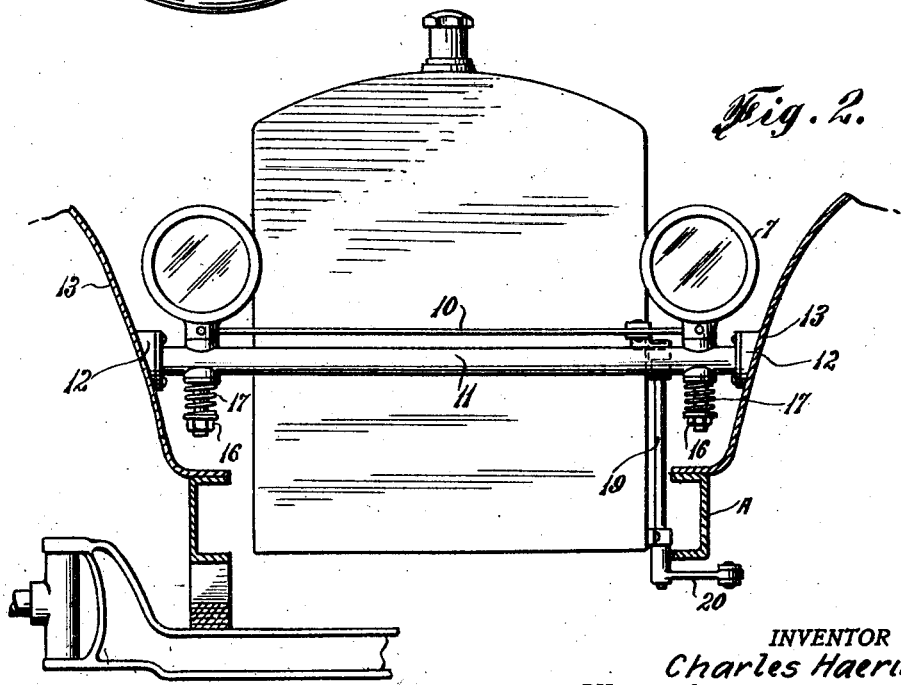
Figure 2 is a front elevation of the same.

Referring to the drawings, A represents the parallel longitudinal frame members of an automobile chassis, one frame member carrying the box or housing 1 for the usual steering worm and pinion through which operative movements are imparted to the lever 2 connected by links 3 with the steering knuckle 4. Usual types of steering shaft 5 and steering wheel 6 are illustrated.

The headlights or lamps 7 may be of any suitable construction. In the present case they are of drum-head design, and each light is carried upon the head 8 of a bolt or shaft $8^x$. Each of the shaft heads 8 is provided with a transversely extending arm 9, the two arms being connected by a link rod 10.

The supporting member for the headlights consists, in the present instance, of a tubular bar 11 which is supported by means of brackets 12 to the splash aprons 13 of the front fenders 14. This bar may be secured to the automobile in any other suitable manner as, for example, by brackets rising from the front portions of frame members A. Toward each end of the bar 11 the latter is formed with a vertical aperture to receive an upper member 15 of a bushing comprising that member and the lower member $15^x$.

Shaft $8^x$ of the lamp-carrying rod passes through bushing members 15, $15^x$, the member 15 extending through the aperture of the bar and into the member $15^x$. Upon the lower end of lamp shaft $8^x$ is threaded a nut 16 which holds in place a spring 17 having a tension against lower bushing member $15^x$. This spring serves to steady the headlight.

To link rod 10 is secured an operating lever 18 connected with a vertical shaft 19 on the lower end of which is secured a crank arm 20, the latter being connected by means of link 21 with the steering lever 2.

Vertical shaft 19 may be journalled in suitable bearing members carried by a bracket supported by the frame, but in the present instance I have shown the shaft guided by means of two small brackets 22 carried by the radiator shell 23.

In the operation of the device, rotation of the steering wheel 6 and consequent movement of the steering lever 2 will angularly turn the wheels B in the direction desired by the driver, as in turning a corner or moving to the side of the road. With each angular movement of the wheels a corresponding movement is imparted to the headlights by reason of the connection between the steering lever 2 and the headlights through link rod 21, vertical shaft 19, lever 18 and link 10 and the incidental connections with the said headlights or lamps.

It will be understood that various modifications may be made in the form and arrangement of the elements comprising the invention without departing from the spirit of the matter, what I claim and desire to secure by Letters Patent being as follows:—

In headlights for automobiles, a horizontal tube adapted to be supported at each end upon the fender of an automobile, the tube being provided with spaced vertical apertures, a bushing formed as a bearing sleeve within each aperture and having a flat smooth surfaced top and flanges engaging the tube laterally of its aperture, a vertical headlight supporting rod passing through the sleeve, a bushing member embracing the rod below the tube, a spring surrounding the rod and engaging the bushing member, an adjusting member for the spring threaded on the rod, a link connecting the supporting rod of one headlight to the supporting rod of a second headlight and means for simultaneously turning the rods, said means being adapted for connection with the steering mechanism of an automobile.

In testimony whereof, I have signed my name to this specification.

CHARLES HAERING.